United States Patent [19]

Davidovits

[11] 4,349,386
[45] Sep. 14, 1982

[54] MINERAL POLYMERS AND METHODS OF MAKING THEM

[76] Inventor: Joseph Davidovits, 16, rue Galilee, F-02100 Saint Quentin, France

[21] Appl. No.: 182,571

[22] Filed: Aug. 29, 1980

[30] Foreign Application Priority Data

Sep. 4, 1979 [FR] France .................................. 79 22041

[51] Int. Cl.$^3$ ....................... C01B 33/26; C04B 35/16
[52] U.S. Cl. .......................................... 106/85; 106/84; 106/286.2; 106/286.5; 264/319; 264/333; 423/328; 423/329; 501/153
[58] Field of Search .................. 423/327–330, 423/118; 252/455 Z; 106/288 B, 39.5, 40 R, 73.4, 85, 86, 286.2, 286.5, 74, 84; 264/299, 319, 333

[56] References Cited

U.S. PATENT DOCUMENTS

| | | | |
|---|---|---|---|
| 3,030,181 | 4/1962 | Milton | 423/328 |
| 3,054,657 | 9/1962 | Breck | 423/328 |
| 3,248,170 | 4/1966 | Kuetinskas | 423/328 |
| 3,374,058 | 3/1968 | McDaniel et al. | 423/328 X |
| 3,594,121 | 7/1971 | Weber | 423/328 |

OTHER PUBLICATIONS

Barrer et al. "J. Chemical Society", 1959, pp. 195–208, 1956, pp. 2882–2891.
Barrer "Trans. Brit. Ceramic Soc." 56, 1957, pp. 155–173.

*Primary Examiner*—Edward J. Meros
*Attorney, Agent, or Firm*—Kendrick, Netter & Bennett

[57] ABSTRACT

New mineral polymers called polysialates have the empiral formula $M_n[-(Si-O_2-)_z-Al-O_2-]_n$, w-$H_2O$ where z is 1, 2 or 3, M is sodium, or sodium plus potassium, n is the degree of polycondensation, and w has a value up to about 7. The method for making these polymers includes heating an aqueous alkali silico-aluminate mixture having an oxide-mole ratio within certain specific ranges for a time sufficient to form the polymer.

10 Claims, No Drawings

MINERAL POLYMERS AND METHODS OF MAKING THEM

This invention relates to a mineral polycondensation process for making cast or molded products at temperatures generally up to about 120° C. This process is related to processes for making zeolites or molecular sieves. The products of this process, however, have characteristic three-dimensional frameworks which are successions of tetrahedrons $TO_4$ where T is silicon, aluminum, gallium, phosphorous or the like. These products form channels or voids of regular dimensions when cast or molded. The voids are molecular in size. Accordingly, the polymers can be used to separate organic molecules of different molecular sizes. These structures also exhibit ion exchange properties. Moreover, the products catalyze several different organic polymerization systems.

Numerous patents and other references describe methods for making these synthetic minerals, zeolites and molecular sieves. D. W. Breck's book entitled "Zeolite Molecular Sieves," published by Interscience in 1974, is a good reference. Generally, these methods are hydrothermal synthesis of silico-aluminate gels in strong, highly concentrated aqueous alkali. The reactant mixture, containing a large excess of water, is sealed in a container at constant pressure and temperature. Preferably, the pressure is atmospheric, and the temperature is in the range of about 25° C., to about 120° C. The reaction continues until crystallization of the product occurs. The chemical formula for the resulting synthetic zeolites and molecular sieves may be written as follows:

$$M_{a/n}Al_bSi_cO_{2(a+b)}, wH_2O$$

wherein M is a cation with the valence "n." Many crystalline products have been made in such hydrothermal syntheses. However, these products are very porous, and have poor mechanical properties, even when agglomerated with a binder.

An object of this invention is to provide synthetic mineral products with such properties as hard surfaces (4–6 on the Mohs scale), thermal stability, and high surface smoothness and precision. Such products are useful for tooling, and for molding art objects, ceramics and the like.

Another object is to provide novel three-dimensional mineral polymers.

Another object is to provide a method of making such new three-dimensional polymers.

Other objects such as use of these polymers as binders are apparent from this specification and claims.

The names for these novel three-dimensional polymers are set forth in the following publications: IUPAC International Symposium on Macromolecules, Stockholm in 1976, Topic III; and PACTEC IV, 1979, Society of Plastic Engineers, U.S.A., preprint page 151. These mineral polymers are called polysialates, and have this empirical formula:

$$M_n[-(Si-O_2)_z-Al-O_2-]_n, wH_2O$$

wherein z is 1, 2 or 3; M is a monovalent cation such as potassium or sodium, and n is the degree of polycondensation. Where z is 2, the polysialate has the formula:

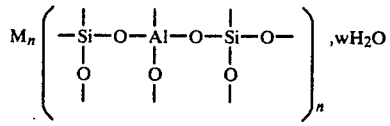

and is called polysialatesiloxo or PSS for short.

Our new polymers are of the PSS type where M is sodium or a mixture of sodium and potassium. In the latter case, the polymer is called (sodium, potassium) polysialatesiloxo or NaKPSS. The chemical formula of NaKPSS may be written as:

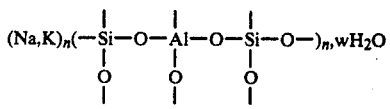

A suitable method for distinguishing our new polymers from known polymers is through their x-ray powder diffraction patterns. NaKPSS has the characteristic x-ray powder diffraction pattern given in Table A below. To obtain this data, we used the Debye-Scherrer method. The radiation used was the K-alpha doublet of copper.

TABLE A

| Diffraction Pattern for (Na,K)PSS | |
|---|---|
| Interplanar Spacing (in Angstroms) | Relative Intensity of the Lines |
| 11.20 | Broad amd blurred |
| 4.30 | Middle strong |
| 3.43 | Strong |
| 3.29 | Strong |
| 3.08 | Middle strong |
| 2.97 | Middle strong |
| 2.71 | Weak |
| 2.46 | Weak |
| 2.30 | Middle Strong |
| 2.11 | Weak |
| 1.92 | Very strong |
| 1.81 | Middle strong |

The x-ray pattern of (Na,K)PSS is related to, but distinctly different from that of natural Gmellinite. Gmellinite is a zeolite with this chemical formula:

$$(Na_2O, K_2O):4SiO_2:Al_2O_3:6H_2O.$$

Gmellinite is called zeolite "S" in U.S. Pat. No. 3,054,657. The x-ray pattern of zeolite S shows middle strong lines at the interplanar spacings 7.16, 5.03, 4.50, and 4.12 Angstroms. Zeolite S plainly differs greatly from NaKPSS.

As Table B shows, the oxide-mole ratios of the reactant mixtures for these two polymers are completely different:

TABLE B

| Oxide-Mole Ratios of the Reactant Mixtures | | | |
|---|---|---|---|
| Zeolite S | | (Na,K)PSS | |
| $Na_2O/SiO_2$ | 0.3 to 0.6 | $(Na_2O,K_2O)/SiO_2$ | 0.25 to 0.28 |
| $SiO_2/Al_2O_3$ | 6 to 25 | $SiO_2/Al_2O_3$ | 4.0 |
| $H_2O/Na_2O$ | 18 to 100 | $H_2O/(Na_2O,K_2O)$ | 16 to 17.5 |
| $Na_2O/Al_2O$ | 1.80 to 15 | $(Na_2O/K_2O)/Al_2O_3$ | 1.0 to 1.14 |

The method for making NaKPSS comprises preparing a sodium silico-aluminate/potassium silico-aluminate water mixture where the composition of the reactant mixture, in terms of oxide-mole ratios, falls within the ranges shown in table C below.

TABLE C

| Oxide-Mole Ratios of the Reactant Mixture | |
|---|---|
| $(Na_2O,K_2O)/SiO_2$ | 0.20 to 0.28 |
| $SiO_2/Al_2O_3$ | 3.5 to 4.5 |
| $H_2O/(Na_2O,K_2O)$ | 15 to 17.5 |
| $(Na_2O,K_2O)/Al_2O_3$ | 0.8 to 1.20 |

The usual method for preparing this mixture comprises dissolving in water an alumino-silicate oxide, alkali, and a colloidal silica sol or alkali polysilicate. The alumino-silicate oxide $(Si_2O_5,Al_2O_2)_n$ may be prepared from a polyhydroxy-alumino-silicate having the formula $(Si_2O_5,Al_2(OH)_4)_n$, where the aluminum cation is in the octahedral state and is in six-fold coordination. The polyhydroxy-alumino-silicate is calcined and dehydroxylated at, say, 550° C. The resulting alumino-silicate oxide has the aluminum cation in four-fold coordination and in a tetrahedral position.

Various polyhydroxy-alumino-silicates may be used as the starting material for the preparation of alumino-silicate oxide, including minerals having basal spacings of about seven Angstroms and having at least one aluminum cation located in the octahedral layers. Examples are alushite, carnat, china clay, lithomarge, neokaolin, parakaolinite, pholenite, endellite, glossecolite, halloysite, milanite, berthierine, fraignotite, grovenite, amesite, and chamoisite.

The quantities of the reactants, namely colloidal silica sol and/or polysilicate, and strong alkalis such as sodium hydroxide and potassium hydroxide, fall in the ranges shown in Table C. Preferably, the ratio $(Na_2O,K_2O)/Al_2O_3$ is about 1.0 and the ratio $SiO_2/Al_2O_3$ is about 4.0. Higher ratios induce a free alkalinity in the solidified polymer and cause alkali silicate migration which can disturb the physical and mechanical properties of the resulting mineral products. However, if the ratio of sodium oxide and potassium oxide combined to aluminum trioxide is lower than 0.8, and the ratio of silicon oxide to aluminum trioxide is lower than 3.5, the alumino-silicate oxide in excess may not polycondense and will remain as a white powder within the hardened NaKPSS product. Preferably, the oxide-mole ratios should be close to stoichiometric values. The NaKPSS will have a composition expressed in terms of oxides as follows:

$$1.0 \pm 0.2(yNa_2O, zK_2O):Al_2O_3:xSiO_2:wH_2O$$

where, in the fully hydrated form, w is in the range of about 5 to about 7, x is a value in the range of about 3.5 to about 4.5, y and z have values up to 1, and the sum of y and z is 1.

By contrast, stoichoimetric conditions are not used to make synthetic crystalline zeolites and molecular sieves. The oxide-mole ratios of reactant mixtures for such products are always much higher than stoichiometric values, as Table B shows.

In the reactant mixture, the quantity of water present equals the sum of solvent water plus the bound water in the reactants. The reactant mixture is viscous, but is not a gel. Rather, the mixture becomes a mineral resin with unique rheological properties after reacting for at least about one hour at ambient temperature, say 25° C.

After aging, the mineral resin may be used alone, or may be mixed with inorganic or organic additives or fillers. The resin may be used as a binder or a mineral cement for organic or mineral particles or fibers. The resin is cast, poured or squeezed into a mold and heated to a temperature up to about 120° C., but preferably to a temperature in the range of about 60° C., to about 95° C. When polycondensation is complete, the solids are separated from the mold and dried at a temperature in the range of about 60° C., to about 100° C.

Polycondensation and heating times are a function of the temperature and the heating process used. At an ambient temperature such as 25° C., polycondensation requires more than 15 hours. At 50° C., polycondensation requires about four hours; at 85° C., about 1.5 hours, and at 95° C., about 0.5 hours. These times may differ and are often shorter when other heating techniques are used. Such other techniques include high frequency, microwave, Joule effect, or electrical wires within the reactant mixture itself. Because the reactant mixtures are polyelectrolytes, these heating techniques effect polycondensation and drying very rapidly. For example, using a microwave heater, the polycondensation described in Example 1 is complete in only 30 seconds, instead of the 1.5 hours required there.

The shelf life of the mineral resin can be as long as two to four hours at ambient temperature depending on the sequence of mixing the reactants. Longer pot life is attained if the strong alkali is not mixed directly with the reactive alumino-silicate oxide. In fact, if the alkalis are added directly to the alumino-silicate oxide solution, the resulting product differs from the polymers of this invention. Direct addition gives a strongly exothermic reaction, and produces a product similar to zeolite A or hydroxysodalite.

Our method of preparing our new polymers comprises making either the alumino-silicate oxide or the sodium and potassium hydroxides. Making of the sodium and potassium hydroxides can be effected by mixing the alkalis in water with polysilicate, and then adding this solution to the alumino-silicate oxide. Preferably, we mix the alumino-silicate oxide with aqueous polysilicate, to the exclusion of alkali, and add this solution to a strong aqueous solution. These two reactant mixtures are stable and retain their reactivity even after long storage periods. Moreover, these mixtures are easy to handle and store.

Polycondensation is best effected in a closed mold under hydrothermal conditions and in the presence of water. Evaporation of water from the mixture during polycondensation is undesirable. To prevent water evaporation at the surface of a reactant mixture placed in an open mold, the surface can be covered with a thin plastic film or thin layer of a hydrophobic liquid. After heating the mixture in the mold, the polycondensed solid is separated from the mold and dried. The molded object has good physical and mechanical properties, including a surface hardness in the range of 3 to 6 Mohs, depending on the nature of the mineral fillers added to the resin. The precision of the molded product's surface compares favorably with the quality obtained with such organic resins as epoxies and polyurethanes.

The following examples illustrate the methods of making the new polymers, and some of the properties of these polymers as well.

EXAMPLE I

We prepared 317 grams of a reactant mixture containing 8.1 moles water, 0.47 moles sodium oxide, 1.65 moles of silicon dioxide, and 0.41 moles of aluminum trioxide. The source of aluminum trioxide is the alumino-silicate oxide prepared by dehydroxylating a natural polyhydoxy-alumino-silicate $(Si_2O_5,Al_2(OH)_4)_n$. The source of silicon dioxide is this alumino-silicate oxide and an alkali silicate. The source of sodium oxide is sodium hydroxide. The oxide molar ratios in the reactant mixture are shown in Table D.

TABLE D

| | |
|---|---|
| $Na_2O/SiO_2$ | 0.28 |
| $SiO_2/Al_2O_3$ | 4.02 |
| $H_2O/Na_2O$ | 17.20 |
| $Na_2O/Al_2O_3$ | 1.14 |

The reactant mixture, which had the viscosity of a resin, was aged for a period of one hour at ambient temperature, then placed under vacuum to eliminate air and gas bubbles. The outgassed resin was poured into a urethane mold to reproduce the relief of a medal.

The surface of the resin in contact with the atmosphere was covered with a thin polyethylene film to prevent water evaporation during curing, which was effected at 85° C., in an oven over a period of 1.5 hours.

The hardened mineral product was separated from the mold and dried at 85° C. It reproduced the mold surface with all original details of the mold surface intact. The density of the product was 1.4 grams per milliliter, and its hardness was 3–4 (Mohs scale). The product was white and porous, and its external dimensions indicated that the polycondensation took place without any shrinkage or dilation of the material. Chemical analysis of the mineral product gave this molar composition:

$$1.14Na_2O:Al_2O_3:4SiO_2:5H_2O$$

which corresponds to the formula of (Na)PSS

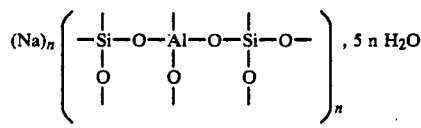

which has an x-ray diffraction pattern essentially that shown in Table A.

Materials from which the mold may be made include iron, paper, wood and plastics, indeed all materials except aluminum and copper. Even aluminum and copper molds can be used if they are covered with a thin layer of organic resin.

EXAMPLE II

Following the steps described in Example I, we prepared 296 grams of reactant mixture containing 7.5 moles of water, 0.33 moles of sodium oxide, 0.08 moles of potassium oxide, 1.65 moles silicon dioxide, and 0.41 moles of aluminum trioxide. The source of potassium oxide was anhydrous KOH. The oxide-mole ratios of the reactant mixture are set forth in Table E.

TABLE E

| | |
|---|---|
| $(Na_2O,K_2O)/SiO_2$ | 0.25 |
| $SiO_2Al_2O_3$ | 4.02 |
| $H_2O/(Na_2O,K_2O)$ | 17.30 |
| $Na_2O/Al_2O_3$ | 0.8 |
| $K_2O/Al_2O_3$ | 0.2 |

$(Na_2O,K_2O)/Al_2O_3 = 1.0$

The reactant mixture, which had the viscosity of a resin, was aged for one hour at ambient temperature (25° C.). To this aged mineral resin we added 280 grams of fine white mullite with a size range between 100 and 150 microns. We poured this mixture into the same mold used in Example I.

After polycondensation in the mold at 85° C., for 1.5 hours, and following the drying conditions described in Example I, the cured mineral medal had a density of 1.8 grams per milliliter. The diameter of the product was 85.8 millimeters. (The mold's diameter at 25° C. was just 85.4 millimeters. However, the mold had diameter of 85.08 millimeters at the 85° C., molding temperature.) Apparently, the cured mineral polymer had the same diameter as the heated mold.

The molded product had a surface hardness of five on the Mohs scale, and the reproduction of the medal surface from the mold was very exact.

Chemical analysis of the mineral product gave a mixture of mullite and (Na,K)PSS with a molar composition as follows:

$$0.8Na_2O:0.2K_2O:4.02SiO_2:Al_2O_3:6H_2O$$

The x-ray powder diffraction pattern is a mixture of the lines characteristic of crystalline mullite and of NaKPSS as set forth in Table A.

Thermogravimetric analysis of NaKPSS gave two endothermic peaks, the first between 150° C., and 200° C., the second between 320° C., and 370° C. The first peak corresponds to the loss of "zeolitic water," amounting to about 9% by weight of the fully hydrated polymer. The second peak corresponds to the loss of hydroxyl groups constituting about 12% by weight of the fully hydrated polymer.

The pH of the fully hydrated NaKPSS is about 10 to 10.5, which means that the polymer was free from excess alkali. However, as with other zeolitic materials, the sodium and potassium cations may migrate in the presence of water. This effect vanishes if the NaKPSS is heated to a temperature higher than the second endothermic peak of the thermogravimetric analysis, or higher than 370° C. After this postcuring at a temperature above 370° C., the sodium and potassium cations do not migrate in the presence of water.

Full dehydration and dehydroxylation of NaKPSS transforms a mineral polymer into a product having properties like ceramic materials. Its formula

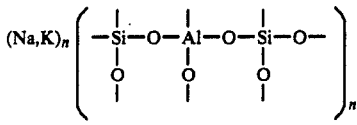

corresponds to the molar composition $$1.0\pm0.2(yNa_2O,zK_2O):Al_2O_3:xSiO_2$$

where x has a value in the range of about 3.5 to about 4.5, and y and z have values up to 1 such that the sum of y and z is 1.

EXAMPLE III

We mixed one kilogram of foundry sand with 50 grams containing 5% by weight of the mineral resin prepared according to Example II. The resulting sand/resin mixture was pressed into two molds. One mold was thermoset at 85° C., for a period of 1.5 hours; the second mold was cured at ambient temperature for 15 hours. We obtained two cores suitable for foundry use in which the sand was bound with the mineral polymer having the following molar composition:

$$0.8Na_2O:0.2K_2O:4,02SiO_2:Al_2O_3:5H_2O$$

This molar composition corresponds to the molar composition of NaKPSS.

What is claimed is:

1. A polymer having a composition expressed in terms of oxides as follows:

$$1.0\pm 0.2(yNa_2O,zK_2O):Al_2O_3:xSiO_2:wH_2O$$

where, in the fully hydrated form, w is in the range of up to about 7, x is in the range of about 3.5 to about 4.5, and y and z have values such that the sum of y and z equals 1, said polymer having the following formula

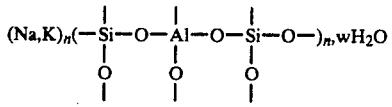

wherein n is the degree of polymerization, and said polymer having an x-ray powder diffraction pattern essentially that shown below:

| Interplanar Spacing (in Angstroms) | Relative Intensity of the Lines |
| --- | --- |
| 11.20 | Broad and blurred |
| 4.30 | Middle strong |
| 3.43 | Strong |
| 3.29 | Strong |
| 3.08 | Middle strong |
| 2.97 | Middle strong |
| 2.71 | Weak |
| 2.46 | Weak |
| 2.30 | Middle strong |
| 2.11 | Weak |
| 1.92 | Very strong |
| 1.81 | Middle strong |

2. A method for preparing the polymer of claim 1 which comprises preparing an alkali silico-aluminate/water mixture wherein the oxide-mole ratios of said mixture fall within the following ranges:

| | |
| --- | --- |
| $(Na_2O,K_2O)/SiO_2$ | 0.20 to 0.28 |
| $SiO_2/Al_2O_3$ | 3.5 to 4.5 |
| $H_2O/(Na_2O,K_2O)$ | 15 to 17.5 |
| $(Na_2O,K_2O)/Al_2O_3$ | 0.8 to 1.20 | and heating said mixture until said polymer forms.

3. The method according to claim 2 further comprising adding a substantial amount of at least one filler to said mixture before heating said mixture to form said polymer.

4. A method for preparing a polymer having the formula

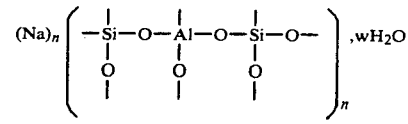

wherein n is the degree of polymerization which comprises heating a sodium silico-aluminate/water mixture whose composition, in terms of oxide-mole ratios, falls within the following range:

| | |
| --- | --- |
| $Na_2O/SiO_2$ | 0.28 |
| $SiO_2/Al_2O_3$ | 4.02 |
| $H_2O/Na_2O$ | 17.20 |
| $Na_2O/Al_2O_3$ | 1.14 | said polymer having an x-ray powder diffraction pattern essentially that shown below:

| Interplanar Spacing (in Angstroms) | Relative Intensity of the Lines |
| --- | --- |
| 11.20 | Broad and blurred |
| 4.30 | Middle strong |
| 3.43 | Strong |
| 3.29 | Strong |
| 3.08 | Middle strong |
| 2.97 | Middle strong |
| 2.71 | Weak |
| 2.46 | Weak |
| 2.30 | Middle strong |
| 2.11 | Weak |
| 1.92 | Very strong |
| 1.81 | Middle strong |

5. A method for preparing a mineral polymer having the formula

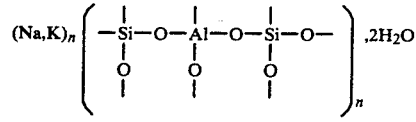

wherein n is the degree of polymerization which comprises heating a sodium and potassium silico-aluminate/water mixture having a composition in terms of oxide-mole ratios within these ranges:

| | | |
| --- | --- | --- |
| $(Na_2O,K_2O)/SiO_2$ | 0.25 | |
| $SiO_2/Al_2O_3$ | 4.02 | |
| $H_2O/(Na_2O,K_2O)$ | 17.30 | |
| $Na_2O/Al_2O_3$ | 0.8 | $(Na_2O,K_2O)/Al_2O_3 = 1[,].0[.]$ |
| $K_2O/Al_2O_3$ | 0.2 | | said polymer having an x-ray powder diffraction pattern essentially that shown below:

| Interplanar Spacing (in Angstroms) | Relative Intensity of the Lines |
| --- | --- |
| 11.20 | Broad and blurred |
| 4.30 | Middle strong |

| Interplanar Spacing (in Angstroms) | Relative Intensity of the Lines |
| --- | --- |
| 3.43 | Strong |
| 3.29 | Strong |
| 3.08 | Middle strong |
| 2.97 | Middle strong |
| 2.71 | Weak |
| 2.46 | Weak |
| 2.30 | Middle strong |
| 2.11 | Weak |
| 1.92 | Very strong |
| 1.81 | Middle strong |

6. A method according to any one of claims 2, 3, 4 or 5 wherein the aqueous silico-aluminate mixture contains an alumino-silicate oxide $$(Si_2O_5, Al_2O_2)_n$$

wherein n is the degree of polymerization.

7. The method according to any one of claims 2, 3, 4 or 5 further comprising preparing said silico-aluminate/water mixture by preparing an aqueous silico-aluminate oxide mixture, substantially free of sodium and potassium hydroxides, preparing an aqueous solution including polysilicate and sodium or sodium and potassium hydroxides, and adding said aqueous solution to said aqueous mixture.

8. A method according to any one of claims 2, 3, 4 or 5 comprising preparing said silico-aluminate/water mixture by preparing an aqueous silico-aluminate mixture including polysilicate and silico-aluminate oxide and then adding the mixture to an aqueous solution of sodium hydroxide or sodium and potassium hydroxides.

9. A method comprising forming an alkali silico-aluminate/water mixture in which the oxide-mole ratios fall within the following ranges:

| | |
| --- | --- |
| $(Na_2O, K_2O)/SiO_2$ | 0.20 to 0.28 |
| $SiO_2/Al_2O_3$ | 3.5 to 4.5 |
| $H_2O/(Na_2O, K_2O)$ | 15 to 17.5 |
| $(Na_2O, K_2O)/Al_2O_3$ | 0.8 to 1.20 | and heating said mixture until a polymer having an x-ray powder diffraction pattern essentially that shown below, forms:

| Interplanar Spacing (in Angstroms) | Relative Intensity of the Lines |
| --- | --- |
| 11.20 | Broad and blurred |
| 4.30 | Middle strong |
| 3.43 | Strong |
| 3.29 | Strong |
| 3.08 | Middle strong |
| 2.97 | Middle strong |
| 2.71 | Weak |
| 2.46 | Weak |
| 2.30 | Middle strong |
| 2.11 | Weak |
| 1.92 | Very strong |
| 1.81 | Middle strong | combining said polymer with a substantial quantity of at least one filler to form a polymer/filler mixture; placing said polymer/filler mixture in a mold; and heating said polymer/filler mixture in said mold to form a solid, molded article.

10. The method of claim 11 wherein the polymer in said solid molded article is a composition expressed in terms of oxides as follows:

$$1.0 \pm 0.2(yNa_2O, zK_2O):Al_2O_3:xSiO_2$$

where x is a value in the range of about 3.5 to about 4.5, and y and z have values up to 1 such that the sum of y and z equals 1.

* * * * *